(No Model.) 2 Sheets—Sheet 2.

W. S. BULL.
TWO WHEELED VEHICLE.

No. 495,014. Patented Apr. 11, 1893.

Witnesses:
Emil Neuhart
Chas. F. Burkhardt

W. S. Bull Inventor.
By Wilhelm & Bonner
Attorneys.

UNITED STATES PATENT OFFICE.

WILLIE S. BULL, OF BUFFALO, NEW YORK, ASSIGNOR TO JULIA I. BULL, OF SAME PLACE.

TWO-WHEELED VEHICLE.

SPECIFICATION forming part of Letters Patent No. 495,014, dated April 11, 1893.

Application filed December 3, 1892. Serial No. 453,947. (No model.)

*To all whom it may concern:*

Be it known that I, WILLIE S. BULL, a citizen of the United States, residing at Buffalo, in the county of Erie and State of New York, have invented new and useful Improvements in Two-Wheeled Vehicles, of which the following is a specification.

This invention has general reference to two wheeled vehicles, but relates more especially to sulkies having a raised or arched axle and in which the spindles or journals are formed separate from the axle.

One of the objects of my invention is to provide a strong and reliable attachment for securing the spindles to the ends of the axle.

A further object is to render the axle or vehicle frame vertically adjustable with reference to the wheels, so that the elevation of the seat may be varied at will, in accordance with the height of the animal attached to the sulky.

Figure 1:
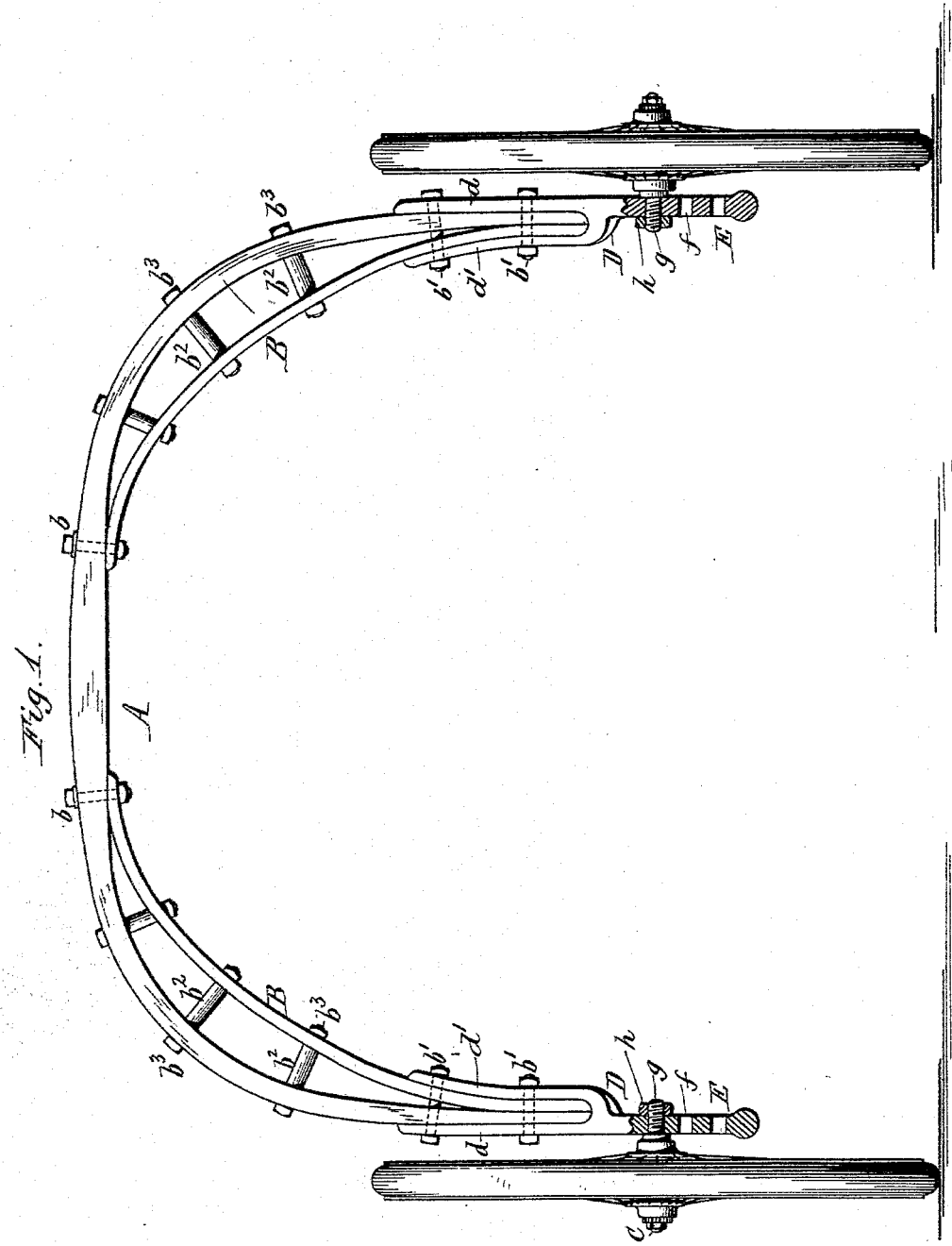
Figure 2:
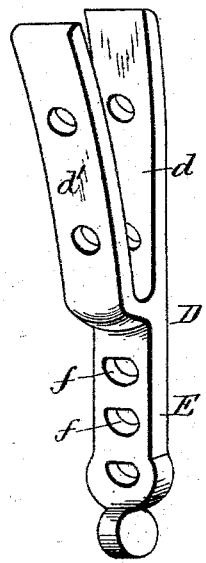
Figure 3:
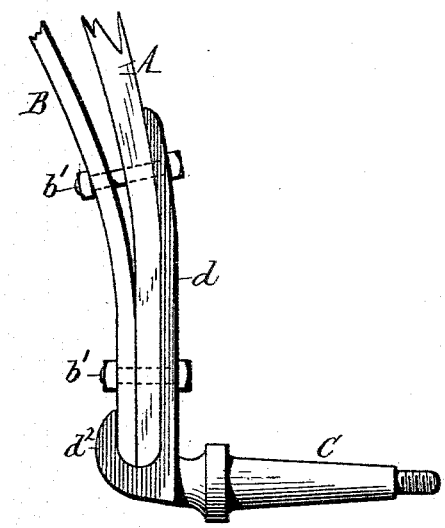
Figure 4:
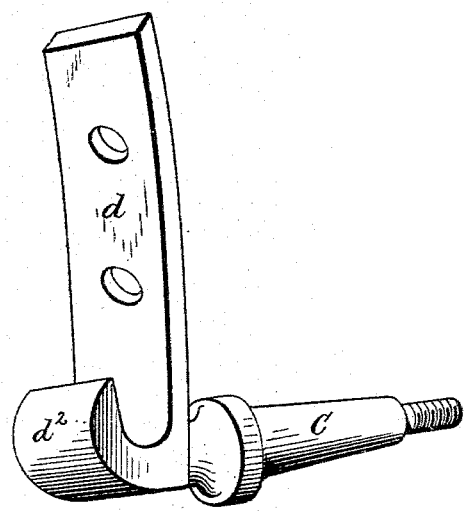

In the accompanying drawings consisting of two sheets:—Figure 1 is a rear view, partly in section, of a sulky embodying my improvements. Fig. 2 is a detached perspective view of one of the spindle brackets or attachments. Fig. 3 is a fragmentary rear view of the axle and one of the spindles showing a modified construction of the bracket or attachment. Fig. 4 is a detached perspective view of this modified attachment.

Like letters of reference refer to like parts in the several figures.

A represents the raised axle which consists preferably of an arch which is stiffened on its inner side opposite its shoulders or curved portions by curved trusses or braces B. These trusses extend from the ends of the arched axle upwardly and inwardly nearly to the middle of the same, and are secured at their upper ends to the crown portion of the axle by transverse bolts $b$, and at their lower portions to the ends of the axle by bolts $b'$. The intermediate portions of the trusses are separated from the inner side of the arched axle by intervening struts or thimbles $b^2$ which surround bolts $b^3$ passing through the axle and the trusses.

C represents the axle-spindles or journals upon which the wheels are mounted. Each spindle is carried by a bracket or attachment D, which is secured to the adjacent end of the arched axle and provided with two upwardly extending clip arms or legs $d$ $d'$ which embrace the vertical end portion of the axle, the leg $d$ bearing against the outer side of the axle and the leg $d'$ against its inner side. These clip legs are secured to the axle by the same bolts $b'$ which fasten the lower portions of the trusses B to the axle, such bolts passing through both clip legs, the axle and the truss.

Instead of extending the inner clip arm or leg of the bracket upwardly to the same height as the outer leg as shown in Figs. 1 and 2, the same may be made in the form of a hook or short arm $d^2$, as shown in Figs. 3 and 4, which hook bears against the inner side of the axle like the inner clip leg of the first described construction.

By providing the spindle-brackets with two arms or legs which bear respectively against the inner and outer sides of the vertical portion of the axle, the strains exerted upon the bracket at or near the lower end of the axle are opposed by the legs on the outer side of the axle as well as on the inner side thereof, thus firmly bracing the bracket in both directions and increasing its security.

By clamping the lower portion of each axle truss B between the inner leg of the spindle bracket and the contiguous inner side of the axle end, this portion of the truss is more securely attached to the axle and the strength of the adjacent portion of the axle is increased.

The axle-spindles may be formed integrally with their attaching brackets, as shown in Figs. 3 and 4, or they may be made separate therefrom. They are preferably made vertically adjustable on their brackets, as shown in Fig. 1, so that the sulky axle or frame can be raised or lowered for accommodating the elevation of the seat to the height of the animal attached to the sulky, without necessitating the use of different sized wheels. For this purpose, each bracket D is provided with a depending lug or downward extension E in which is formed a vertical series of horizontal openings $f$ in either of which the shank $g$ of the axle-spindle may be secured, the sulky frame or axle being raised or lowered, according as the spindles are placed in a higher or lower set of openings. The shank of each spindle is preferably screw threaded and detachably secured in one of the openings of the bracket extension by a clamping nut $h$ applied to the threaded shank and bearing against the inner side of the extension, as shown in Fig. 1.

I claim as my invention—

1. The combination with the axle of the vehicle, having upright end portions, of axle spindles, and brackets or attachments carrying the spindles and each provided with two upwardly extending arms or legs which embrace the adjacent upright end portion of the axle and bear respectively against the inner and outer sides of the same, substantially as set forth.

2. The combination with the arched axle, of axle-spindles, brackets or attachments carrying the spindles and each provided with two upwardly extending arms or legs, the outer one of which bears against the outer side of the upright end portion of the axle, and trusses or braces arranged on the inner side of the axle and each extending from the middle of the axle to the end thereof, and secured with its lower portion between the end portion of the axle and the inner leg of the adjacent spindle bracket, substantially as set forth.

3. The combination with the axle of the vehicle and the detachable spindles, of carrying brackets, each provided with two upwardly extending arms or legs which embrace the adjacent end portion of the axle, and a depending lug or extension having a vertical series of openings which receive the spindle shank, substantially as set forth.

Witness my hand this 28th day of October, 1892.

WILLIE S. BULL.

Witnesses:
JNO. J. BONNER,
CARL F. GEYER.